(12) United States Patent
Rice (10) Patent No.: US 7,673,654 B2
(45) Date of Patent: *Mar. 9, 2010

(54) SYSTEM AND METHOD FOR PIPE REPAIR

(75) Inventor: Brian L. Rice, Perkiomenville, PA (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/040,791

(22) Filed: Feb. 29, 2008

(65) Prior Publication Data

US 2008/0216938 A1 Sep. 11, 2008

Related U.S. Application Data

(60) Division of application No. 11/360,830, filed on Feb. 23, 2006, now Pat. No. 7,426,942, which is a continuation of application No. 11/003,199, filed on Dec. 3, 2004.

(51) Int. Cl.
*F16L 55/16* (2006.01)

(52) U.S. Cl. .............................. 138/99; 138/97; 156/53

(58) Field of Classification Search .................. 138/99, 138/97, 172, 178; 156/194, 94, 49

See application file for complete search history.

(56) References Cited

U.S. PATENT DOCUMENTS

| RE12,703 | E | 12/1907 | Corcorran |
|---|---|---|---|
| 2,492,507 | A | 12/1949 | Tiplon |
| 2,924,546 | A | 2/1960 | Shaw |
| 3,228,712 | A | 1/1966 | Hausman et al. |
| 3,350,050 | A | 10/1967 | Buczala |
| 3,358,898 | A | 12/1967 | Medkeff et al. |

(Continued)

FOREIGN PATENT DOCUMENTS

CA 1030714 9/1978

(Continued)

OTHER PUBLICATIONS

A. G. Gibson, The cost effective use of fibre reinforced composites offshore, Apr. 2003, University of Newcastle Upon Tyne for the Health and Safety Executive, Newcastle Upon Tyne, United Kingdom.

(Continued)

*Primary Examiner*—Patrick F Brinson
(74) *Attorney, Agent, or Firm*—Fletcher Yoder (57) ABSTRACT

A system and method of repairing a pipe including securing a reinforcing material, such as a dry fiber structure (e.g., a carbon fibers) to the surface of the pipe. A polymeric material is placed on top of the reinforcing material, self-penetrating the dry fiber structure. The polymeric material substantially saturates the reinforcing material and cures to form a reinforced polymeric composite which may increase or restore the pressure rating or operating pressure capacity of the pipe. Optionally, an outer containment component, such as a sleeve, shell, box, wall, outer pipe, and so on, may be installed around the reinforcing material prior to introduction of the polymeric material. In this case, the polymeric material may be placed (i.e., poured) into the interior of the containment component on top of the reinforcing material.

20 Claims, 6 Drawing Sheets

U.S. PATENT DOCUMENTS

| | | |
|---|---|---|
| 3,563,276 A | 2/1971 | Hight et al. |
| 3,907,004 A | 9/1975 | Yamaguchi et al. |
| 3,989,281 A | 11/1976 | Wilde |
| 4,511,415 A | 4/1985 | Dienes |
| 4,559,974 A | 12/1985 | Fawley et al. |
| 4,981,901 A | 1/1991 | Noda et al. |
| 5,027,862 A | 7/1991 | Laybourn |
| 5,201,600 A | 4/1993 | Topf, Jr. et al. |
| 5,346,939 A | 9/1994 | Moren et al. |
| 5,364,693 A | 11/1994 | Moren et al. |
| 5,385,431 A | 1/1995 | Topf, Jr. |
| 5,431,553 A | 7/1995 | Topf, Jr. |
| 5,466,323 A | 11/1995 | Decker et al. |
| 5,536,457 A | 7/1996 | Topf, Jr. |
| 5,632,307 A | 5/1997 | Fawley et al. |
| 5,677,046 A | 10/1997 | Fawley et al. |
| 5,683,530 A | 11/1997 | Fawley et al. |
| 5,942,182 A | 8/1999 | Hoge et al. |
| 6,126,206 A | 10/2000 | Topf, Jr. |
| 6,248,824 B1 | 6/2001 | Decker et al. |
| 6,435,218 B2 | 8/2002 | Hillenbrand et al. |
| 6,435,566 B1 | 8/2002 | Topf, Jr. |
| 6,692,039 B2 | 2/2004 | Topf, Jr. |
| 6,800,157 B2 | 10/2004 | Tarbutton et al. |
| 7,165,579 B2 | 1/2007 | Borland et al. |
| 7,168,743 B2 | 1/2007 | Nadorajah et al. |
| 7,367,362 B2 * | 5/2008 | Rice et al. .............. 138/99 |
| 7,387,138 B2 * | 6/2008 | Rice et al. .............. 138/99 |
| 7,426,942 B2 * | 9/2008 | Rice .............. 138/99 |
| 2003/0151249 A1 | 8/2003 | Topf, Jr. |
| 2004/0129373 A1 | 7/2004 | Nadarajah |
| 2005/0082831 A1 | 4/2005 | Borland |
| 2005/0098208 A1 | 5/2005 | Topf, Jr. |
| 2006/0162797 A1 | 7/2006 | D'Auria et al. |

FOREIGN PATENT DOCUMENTS

| | | |
|---|---|---|
| DE | 2441563 | 2/1976 |
| FR | 2851635 | 8/2004 |
| GB | 2093146 | 8/1982 |
| GB | 2343728 | 5/2000 |
| RU | 94039351 A1 | 8/1996 |

OTHER PUBLICATIONS

AEA Technology Consulting, Temporary/permanent pipe repair-Guidelines, Offshore Technology Report 2001/038, Jul. 2001, Health and Safety Executive.

Boreman, David J., et al., Repair Technologies for Gas Transmission Pipelines, Pipeline & Gas Journal; 227, 3; ABI/INFORM Trade and Industry, pp. 46-51, Mar. 2000.

Clock Spring®, Composite Sleeve Reinforcement System, pp. 1-4, 2004, available at http://www.clockspring.com/PDF/brochure.pdf, last accessed Jun. 11, 2007.

Kessler, Michael R., et al., Evaluation of Carbon/Epoxy Composites for Structural Pipeline Repair, Proceedings of IPC 2004, International Pipeline Conference, Calgary, Alberta, Canada, Paper IPC04-0486: pp. 1-6, Oct. 4-8, 2004.

3X Engineering, Reinforcekit Evolution Implementation, pp. 1-2, 2006, available at http://www.3xengineering.com/corrosion.html, last accessed Jun. 11, 2007.

Declaration of Henry E. Topf, Jr. under 37 C.F.R. 1.132, dated Jun. 15, 2007.

Exhibit A—Handwritten notes signed by Henry E. Topf Jr., dated Jul. 5, 2002.

Exhibit B—Affidavit of Kevin Murphy, dated Dec. 29, 2005.

* cited by examiner

SYSTEM AND METHOD FOR PIPE REPAIR

CROSS-REFERENCE TO RELATED APPLICATIONS

This Application is a Divisional of U.S. application Ser. No. 11/360,830, filed Feb. 23, 2006 (issued as U.S. Pat. No. 7,426,942) which is a Continuation of U.S. application Ser. No. 11/003,199, filed Dec. 3, 2004, both of which are herein incorporated by reference in their entirety for all purposes.

BACKGROUND OF THE INVENTION

The invention relates generally to pipe repair. More particularly, the invention relates to techniques for efficiently repairing a pipe with fiber-reinforced polymeric material.

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Piping is omnipresent in today's society. Piping is found in a wide range of residential, commercial, and industrial applications. For example, piping may be employed in utility distribution, manufacturing processes, chemical/petrochemical transport, energy transmission, plumbing, heating and cooling, sewage systems, as well as in the recovery of spent chemicals/compounds, such as discharges of exhausted chemicals, contaminated water, and so forth. In operation, piping within facilities and over longer distances, may serve to collect, distribute, and transport water, steam, chemicals, petrochemicals, crude oil, natural gas, and a variety of other liquids, gases, and components.

Piping systems, such as pipelines, may convey utilities, energy, and chemical/petrochemical components to industrial patrons, manufacturing sites, chemical/refining facilities, commercial entities, public institutions, consumers, and so on. Undeniably, pipelines (e.g., transmission pipelines) have played a beneficial role in improving productivity in delivery of resources. Indeed, world economies depend on the capability of pipelines to transport feedstocks and products to a diverse range of customers and end-users.

Peak construction of pipelines (e.g., gas and liquid petroleum pipelines) occurred 30-40 years ago, with a majority of these pipelines, including many constructed prior to World War II, still in service. As a result of their age, maintaining the integrity of the aging pipeline infrastructures is costly. Annual costs attributable to mitigating pipeline corrosion and other pipeline failures, potential failures, and anomalies, are in the billions of dollars. Economic considerations of pipeline repair may include labor, material, equipment requirements, available capital, economic return, repair life, pipeline downtime, and so forth. As expected, the economics of pipeline repair can have a significant impact on pipeline productivity.

Pipe failures and damage may be caused by mechanical harm, corrosion, erosion, damaged coatings, failing insulation, adverse operating conditions, weather, and so on. Internal erosion, for example, may occur due to the flow of the contents through the pipeline. Such erosion may be exacerbated by centrifugal forces associated with changes in the direction of the flow path. In regard to corrosion, the external surface of piping may be exposed to corrosive soil or above-ground corrosive environments, and the internal surface of piping may be exposed to corrosive contents. Significantly, erosion, corrosion, and other damage may reduce the wall thickness of the pipe and thus reduce the pressure rating or pressure-holding capacity of the pipe or pipeline. Accordingly, the operations and maintenance personnel of pipeline companies (e.g., gas transmission companies) may determine if a failure or an area of potential failure discovered in a pipeline should be repaired, if a section of the pipe should be replaced, or if the pipeline should be abandoned.

In evaluating repair decisions, pipeline operators and service providers typically consider the pipeline downtime, pipe specifications, the pipe area to be repaired, buried conditions, the above-ground environment, the contents of the piping or pipeline, pipeline operating conditions, and the like. Of course, the pipeline operators and service providers should accommodate regulatory constraints, appropriate industry standards, manufacturer recommendations, and so on. Moreover, the maintenance approach ultimately selected may involve repair of a leak or other failure, or the preemptive repair of a pipe area prior to failure (e.g., leak, rupture, etc.) of the pipeline. Finally, in an effort to maintain pipeline integrity while being mindful of costs, the environment, regulatory constraints, and so on, the pipeline operators and service providers typically assess the maintenance, replacement, and repair of piping/pipelines based on available engineering alternatives and the economic impact of those alternatives. In the case of a repair, several technologies, application techniques, and materials are available.

Common repair technologies employ metal sleeves that are disposed about a section of a pipe to reinforce the pipe. Both welded sleeves and non-welded (mechanical) sleeves may be installed over varying lengths and diameters of piping to repair pipe leaks and other failures. Also, sleeves may preemptively repair potential pipe failures, reinforce pipe areas of internal and external corrosion, upgrade the pressure rating of the piping, and so forth. In general, established sleeve techniques, whether utilizing sleeves welded in place around the pipe, or employing sleeves mechanically secured to the pipe without welding, offer the advantage of being familiar repair approaches in the industry. In the repair of pipelines, operators, engineers, and craftsman are accustomed to working with welded fittings for welded sleeves, as well as with mechanical devices and clamps for non-welded sleeves. Unfortunately, the training of personnel in the suitable mechanical and welding techniques is extensive for proper installation of the sleeves. Further, non-welded and welded sleeve repair of pipelines may result in embrittlement and residual stresses at the point of repair on the pipeline.

For welded sleeves, the sleeves may be welded around the pipe to be repaired, encasing the pipe segment to be reinforced. The mating edges of the sleeve halves may be welded to each other, and the ends of the erected sleeve welded to the pipe, to seal and secure the welded sleeve to the pipe. It should be emphasized that a variety of welding configurations other than the generic approach described above may be employed in installing the welded sleeve. Costs associated with welding repairs, including welded-sleeve repairs (e.g., on high-pressure transmission pipelines), may be attributed to the use of highly-skilled welders, the shutdown and deinventory of the pipeline, and the shutdown of associated manufacturing facilities, chemical/petrochemical processes, and so on.

Generally, it is desirable from an operating cost standpoint to repair piping while the pipeline remains in service, thus eliminating costly downtime. Repair techniques that avoid welding or cutting of the pipe, for example, may make it feasible to maintain the pipeline in service during the repair and thus avoid the costs associated with pipeline downtime. It should be emphasized that a shutdown of a pipeline for repair can potentially force the shutdown of upstream and downstream facilities, resulting in lost production, lost sales, shutdown and startup costs, and so forth.

Non-welded sleeves address this concern, because they generally do not require welding or cutting. Non-welded reinforcement sleeves are mechanically coupled to the pipe section to be repaired. In other words, these non-welded sleeves (also called mechanical sleeves) may be positioned and secured to the pipe by clamps, bolts, and so on. Regrettably, the use of non-welded sleeves may require exotic mechanical techniques to adequately secure the repair and pipe pressure rating, and thus may be more cumbersome and complicated than welding techniques. As a result, pipe repair with non-welded sleeves may be more expensive than repair with welded sleeves. However, repair with non-welded sleeves may advantageously avoid welding at the on-site repair, such as in pipeline areas and in chemical/petrochemical process areas, for example. Further, as indicated, non-welding approaches generally permit uninterrupted operation of the pipeline. On the other hand, in certain configurations for non-welded (mechanical) sleeves, the pipeline may be deinventoried if significant mechanical force is to be applied to the pipe or because of other factors during installation of the non-welded sleeve.

Unfortunately, the special case of repair of piping elbows, piping tees, pipeline bends, and so on, is problematic for both welded and mechanical (non-welded) sleeves due to the difficulty of placing a rigid metal sleeve around the curved pipe bend to be repaired. Further, the rigid metal sleeves may be unable to make adequate contact at the pipeline bends, and thus be unable to reinforce the stressed points that typically exist at the pipeline bends. Furthermore, it may be may be difficult to appropriately match the radius of curvatures of the outer metal sleeve and the pipeline elbow or bend. To avoid these problems with installing sleeves at pipeline bends, a weld filler metal (in lieu of a sleeve) may be deposited on the bend (e.g., in a cavity of an anomaly) but such welded filler repairs are generally appropriate only for limited ranges of pipeline operating pressures and wall thicknesses.

As can be seen from the discussion in the paragraphs above, a variety of challenges exist with welded and non-welded (mechanical) sleeves. On the whole, these established techniques of using reinforcement sleeves, whether welded or non-welded, tend to be costly, require highly skilled labor, result in increased pipe stresses, and increase the need to interrupt pipeline service. A need exists for improved techniques of pipe repair.

In response to the problems and challenges associated with the conventional approaches of welded and non-welded sleeves in the repair of both straight pipe and pipe bends, new technologies have emerged that involve coatings and the use of high-strength plastics, fiber-reinforced plastics, composite materials, and the like. Such polymeric repairs may reduce costs and provide for less embrittlement and residual stresses of than traditional welded and mechanical sleeves. Furthermore, polymeric composites, for example, generally do not oxidize and, consequently, may arrest further external corrosion of the treated area of the pipeline. Moreover, as a result of the growing using of composite repair systems, particularly in the oil and gas transportation industry, the American Society of Mechanical Engineers (ASME) is currently in the process of setting standards for non-metallic wrap technology including development of a new post-construction repair standard. Currently, a draft of the new ASME standard specifies that several material properties of the repair system are to be measured and evaluated.

It should be noted that resin alone (without reinforcing materials) typically does not provide adequate strength for pipe repair, especially in the repair of medium and high pressure pipelines. Accordingly, in general, polymer repair systems are based on a matrix composite fabric with epoxy materials and other resins, creating a monolithic structure around the damaged pipe. In general, a variety of fibers, polymers, resins, pre-polymers, adhesives, and other components may be used to form a composite material structure around the damaged portion of the pipe. In particular, composite repair systems typically employ glass fibers and offer the potential to reduce repair costs of corroded pipes by avoiding costly mechanical sleeves, welding, and downtime.

As discussed below, however, fabrication of these composite repairs tends to be labor intensive. For example, each layer of the fiber is wetted with dripping resin prior to wrapping the fiber around the pipe. Several layers of fiber and resin (also referred to herein as polymer) are methodically applied by hand one layer at a time, with the fibers slowly and carefully pre-wetted in resin prior to the application of each fiber layer. For example, the fiber (e.g., fiber tape) may be pulled through a bath of polymer (e.g., epoxy resin) as the fiber is cumbersomely applied to the pipe. Such tedious handling and open installations pose environmental and application challenges, increased handling of resin chemicals and solvents, increased labor time, and the like.

In addition, as appreciated by those of ordinary skill in the art, the worker should be aware of the resin pot life (i.e., resin set-up time in minutes or hours) where the viscosity of the resin significantly increases as the pot life expires, making it difficult to properly apply the resin to the fiber, and to effectively mold and form the polymer resin composite. The resin pot life should not be confused with the resin cure time which is the time for the resin to form a cross-linked thermoset, typically occurring a day or several days later. The pot life (and associated increase in viscosity) of such resin systems may typically only comprise a few minutes. Undoubtedly, an installation not completed prior to expiration of the resin pot life could result in a flawed composite structure surrounding the pipe and pipe anomaly.

In general, a tension exists between the technique of slow and cumbersome pre-wetting and application of the fiber, layer-by-layer, versus the relatively hasty formation of the viscous resin structure due to expiration of the resin pot life and associated increase in viscosity. Thus, in pipe composite repair, many fiber and resin systems are difficult to mold and shape into the appropriate composite structure that overlay the pipe and pipe anomaly.

BRIEF DESCRIPTION OF THE DRAWINGS

The foregoing and other advantages and features of the invention will become apparent upon reading the following detailed description and upon reference to the drawings in which.

DETAILED DESCRIPTION OF SPECIFIC EMBODIMENTS

One or more exemplary embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

To facilitate discussion of the present techniques, the written description is provided in sections. Section I discusses parts of an exemplary pipe repair system. Section II discusses pipe anomalies and pipeline survey techniques. Section III discusses properties of exemplary reinforcing materials. Finally, Section IV discusses exemplary polymer materials that may be used in pipe repair systems.

I. Pipe Repair System

The present techniques provide for efficient pipe repair by forming a reinforced polymeric composite on the pipe while avoiding the typical extensive handling of the repair materials associated with composite repair. Initially, a section of the pipe to be repaired is identified. To implement the repair, a reinforcing material (e.g., a fiber structure) may be applied to the surface of the pipe section to be repaired. In certain embodiments, the reinforcing material is wrapped around the pipe but it may be applied in other forms, such as a patch. The reinforcing material is applied in a dry state to avoid problems associated with the handling of wet materials (e.g., resin-saturated fiber). The resin may then be applied to the reinforcing material on the pipe. For example, the resin may be applied with a brush, or after securing the reinforcing material to the pipe, an outer containment component (e.g., a sleeve, shell, box, wall, outer pipe, etc.) may be installed adjacent or around the reinforcing material. In the latter instance, a polymeric material, polymer precursor, and/or pre-polymer, and so on, is placed between the containment component and the reinforcing material. It should be emphasized that the term "polymeric material" as used herein is intended to broadly cover a variety of polymers, prepolymers, resins, hardeners, plastics, compounded mixtures, and so forth In certain configurations, a fluid or semi-fluid polymeric material is poured inside the containment component on top of the reinforcing material. The polymeric material penetrates the reinforcing structure prior to any significant increase in viscosity of the polymeric material. The properties of the reinforcing and polymeric materials may be selected such that the polymeric material penetrates or saturates the reinforcing structure by gravity, capillary behavior, external pressure, and so on. Lastly, the polymeric material may be allowed to cure or polymerize, forming a reinforced polymer composite that repairs the pipe and restores operating pressure capacity of the pipe or pipeline.

A. Identify Pipe Anomaly and Apply Dry Fiber Structure to Pipe

Figure 1:
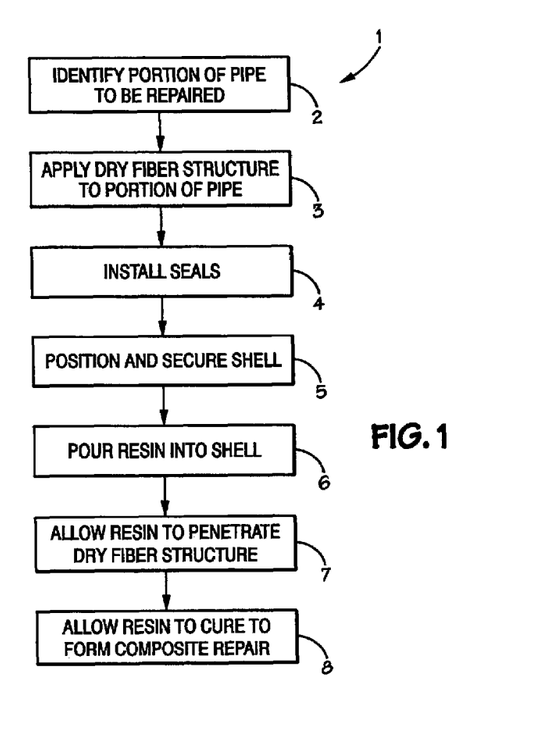
FIG. 1 is a block diagram of an exemplary method of repairing a pipe in accordance with an exemplary embodiment of the present invention.

Turning to the drawings, FIGS. 1-7 depict an exemplary implementation of a pipe repair system 10 which may be used to repair and/or reinforce a pipe, increase the wall thickness of a pipe, restore or increase the pressure rating or pressure capacity of a pipe, repair a vessel or other equipment, and so on. FIG. 1 is a block diagram of a method 1 for repairing a pipe, and will be referred to in the discussion of the exemplary techniques depicted in FIGS. 2-7. Initially, an anomaly may be detected on the inner or outer surface of the pipe, and thus the portion of the pipe to be repaired identified, as indicated in block 2. Upon identification and analysis of the anomaly (and prior to application of a reinforcing material such as a dry fiber structure), the anomaly may be pre-treated in some manner, such as by cleaning the anomaly, grinding or sanding the anomaly, placing filler material in the anomaly, and so on. With or without pre-treatment of the anomaly, the dry fiber structure (e.g., dry fiber tape or a patch) without impregnated resin may be applied or wrapped around the anomaly in the pipe (block 3). The dry fiber structure may be secured at each end by standard adhesives or tape for example.

Figures 2, 3:
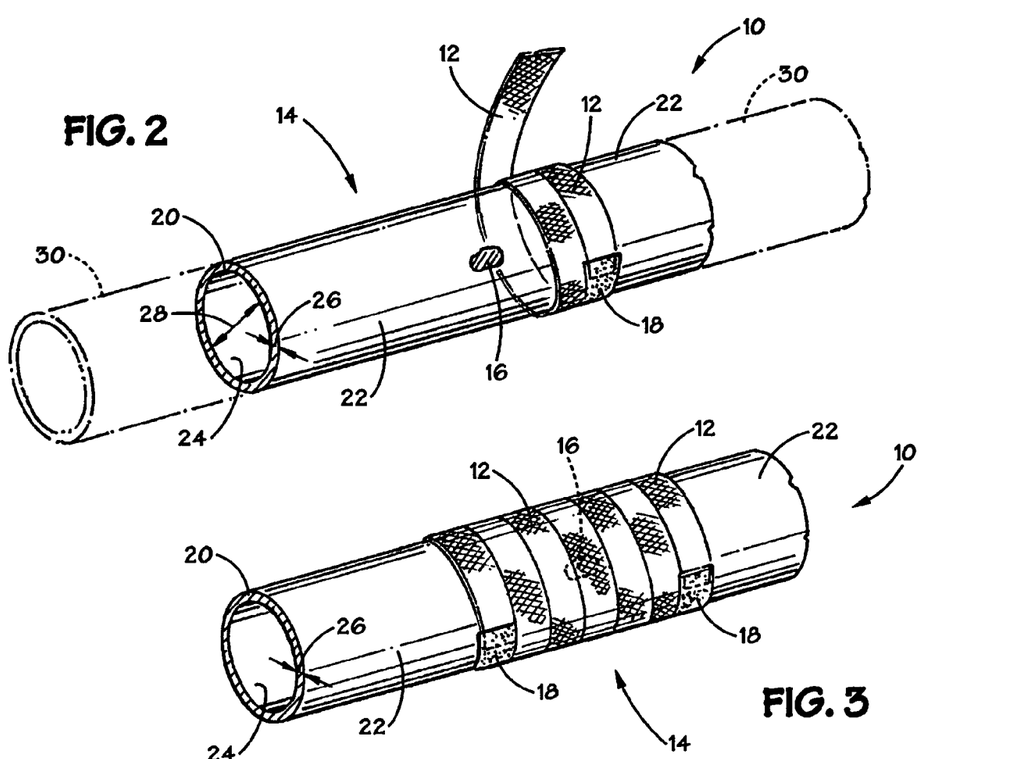
FIG. 2 is a perspective view of a pipe under repair that illustrates a dry fiber mat being applied to the pipe in accordance with an exemplary embodiment of the present invention.
FIG. 3 is a perspective view of the pipe of FIG. 1 depicting the dry fiber not wrapped around and secured to the pipe in accordance with an exemplary embodiment of the present invention.

In the illustrated embodiment of FIGS. 2 and 3, a dry fiber structure 12 (e.g., a dry fiber tape, mat, fabric, etc.) is applied to a pipe 14 having a failure or anomaly 16. The pipe 14 may be part of a pipeline 30 (e.g., a gas or liquid transmission pipeline) and may be constructed of a variety of metallic and/or non-metallic materials, such as cement, plastics, and so on. Exemplary pipe metals may include steel, carbon steel, stainless steel, copper, brass, and more exotic metals such as nickel alloys and other metal alloys, and the like. Exemplary pipe polymeric materials include polypropylene, polyethylene, other thermoplastics, thermosets, filler-reinforced polymers, fiberglass-reinforced plastic, and so on. The pipe 14 may also include internal and external coatings (not illustrated) to arrest corrosion, inhibit exposure to sunlight, protect against chemical attack, and so forth. Lastly, as indicated, the wall thickness 26 of the pipe 14 may be specified to satisfy a desired pressure rating of the pipe 14 and the piping system (e.g., pipeline 30).

In this example, the dry fiber structure 12 may be initially secured to the pipe 14 with an adhesive component 18, such as a typical adhesive or tape previously mentioned. For instance, upon securing one end of the dry fiber structure 12, one or more layers of the dry fiber structure 12 may be wrapped around the pipe 14 to initiate the repair of the failure or anomaly 16 and/or to restore some or all of the pressure rating or pressure capacity of the pipe 14. In general, the dry fiber structure 12 covers the outer surface 22 of a portion of the pipe 14 to be repaired. It should be emphasized that the dry fiber structure 12 may be applied as a patch or other forms instead of wrapped around the pipe. Moreover, the dry fiber structure 12 and repair system 10 may be applied to equipment other than piping, such as vessels, vessel nozzles, machines, tanks, pumps, reactors, and so forth. In the case of a pipe 14, the pipe 14 typically includes a cylindrical wall 20 having an outer surface 22 and an inner surface 24. Variables to consider in the selection of the dry fiber structure 12 to restore or maintain the desired pressure rating of the pipe 14 include the wall thickness 26, the inside diameter 28, the materials of construction of the pipe 14, and other factors.

To reinforce or repair the pipe 14, the present techniques provide for a substantially self-forming composite of the dry fiber structure 12 and resin on the outer surface 22 of the pipe 14. As discussed in detail below, properties of the dry fiber structure 12 and resin may be specified such that hand or wet lay-up is not required because the resin penetrates around the fibers within the dry fiber structure 12 to the outer surface of the pipe 14. Thus, the resin may be applied on top of the fiber structure without having to pre-wet the fibers or layers of the fiber structure. Again, the cumbersome handling of wet dripping fiber may be advantageously avoided.

B. Install Seals and Outer Containment Component on Pipe

Figure 4:
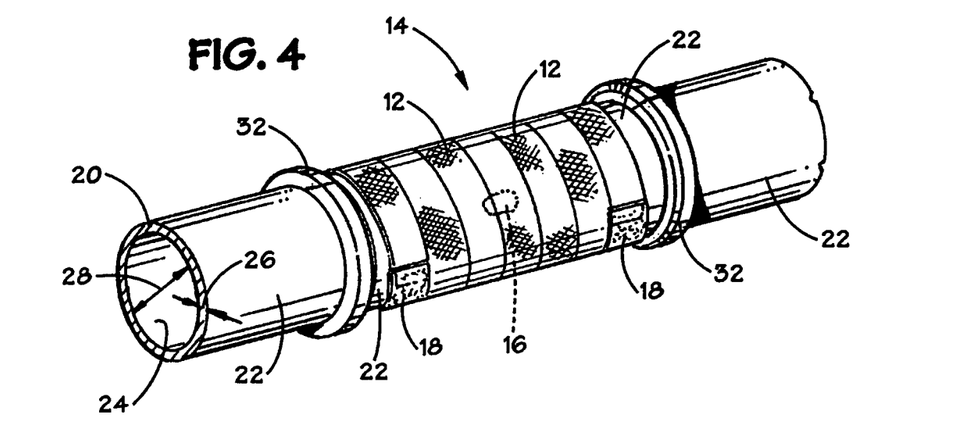
FIG. 4 is a perspective view of the pipe of FIG. 2 having seals installed on the pipe in accordance with an exemplary embodiment of the present invention.
Figure 5:
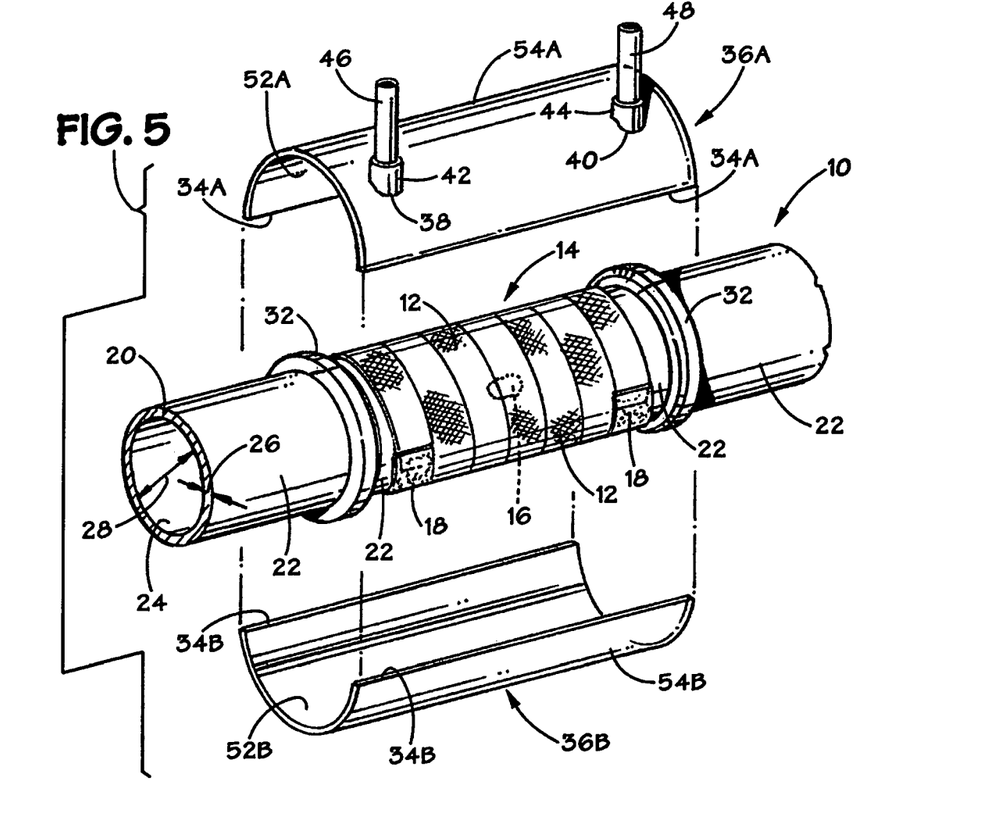
FIG. 5 is an exploded perspective view of the pipe of FIG. 3 illustrating an outer component (e.g., shell) for containing resin and having two halves.
Figure 6:
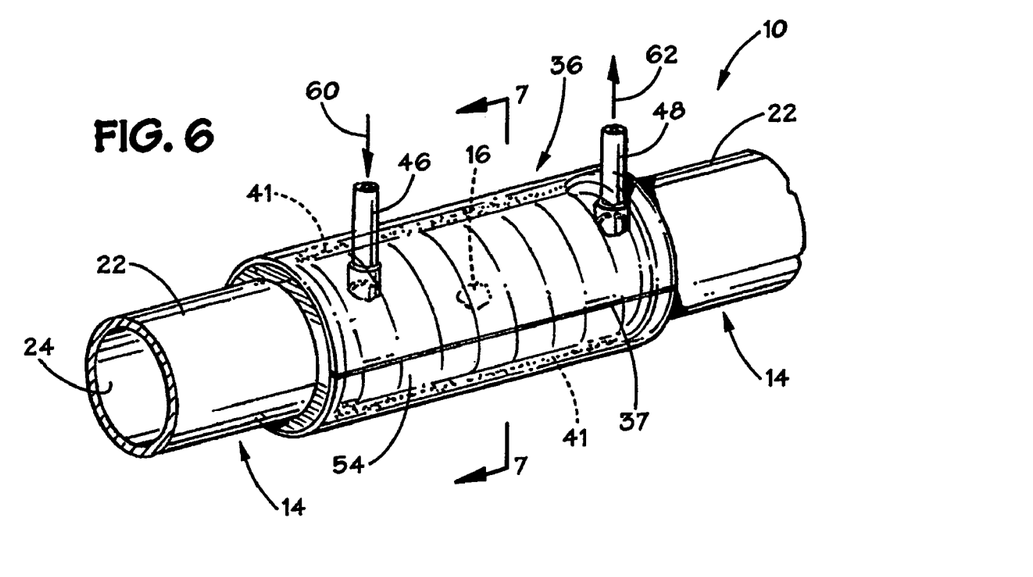
FIG. 6 is perspective view of the pipe of FIG. 4 having the outer component installed around the pipe and mating with the seals in accordance with an exemplary embodiment of the present invention.

Referring now to the method 1 depicted in FIG. 1 and the pipe repair depicted in FIGS. 4-6, seals or seal ends 32, such as flexible rubber strips, metal components, and other elements, may be installed at portions of the pipe 14, such as upstream and downstream of the wrapped and secured dry fiber structure 12 (block 4). Before or after the seals 32 are installed, a containment component 36, such as a sleeve, shell, box, container, and so forth, may be positioned around the portion of the pipe 14 having the dry fabric structure 12. The containment component 36 mates with the seals 32 to form a substantially sealable cavity between the inner surface of the containment component 36 and the outer surface of the pipe 14 and fiber structure 12 (block 5). Furthermore, the containment component 36 may be secured to the pipe 14, for example, by positioning a simple hose clamp or a more sophisticated fastener at each longitudinal end of the containment component (block 5). Such clamping devices on the containment component 36 may also facilitate compression of the seals 32 and thus advance the integrity of the seals 32.

The exemplary embodiments of FIGS. 4, 5, and 6 depict seals 32 disposed in the exemplary pipe repair system 10 toward each end of the section of the pipe 14 to be repaired. In this embodiment, the exemplary seals 32 (e.g., rubber strips) are flexible so that they may be wrapped around the pipe 14 and positioned longitudinally along the pipe 14 outside of the dry fiber 12 wraps. Again, a purpose of the seals 32 is to facilitate formation of a substantially sealable cavity between the section of pipe 14 that includes the dry fiber structure 12 and the inner surface of an outer Containment component 36. The cavity may receive a resin or other polymeric material that penetrates through the dry fiber structure 12 to the outer surface 22 of the pipe 14, ultimately curing into a composite repair of the pipe 14. It should be stressed that sealing configurations other than the exemplary seals 32 may be employed in the present techniques. For example, a foam material may plug the ends between the pipe 14 and the containment component 36. On the other hand, in pressurized containment component 36 systems, for example, more sophisticated seals, such as mechanical seals, may be employed, and so on.

An exemplary containment component 36 having two halves 36A and 36B is illustrated in FIG. 4. The halves 36A and 36B include end surfaces 34A and 34B which mate to encase the pipe 14 segment and the dry fiber structure 12. The containment component 36 may be constructed of thin metal (e.g., ⅛" sheet metal), piping (e.g., standard carbon steel piping), plastic, fabric, and so on. The containment component 36 is installed around the dry fiber structure 12 of pipe 14. In the illustrated embodiment, the two halves 36A and 36B of the containment component 36 are connected at end surfaces 34A and 34B of the containment component 36. The fastening element 37 that secures the two containment component halves 36A and 36B at the half end surfaces 34A and 34B may be welded, bolted, fastened, stapled, glued, and so on.

Moreover, it should be noted that the containment component 36 may instead comprise a single piece or more than two pieces, as well as a variety of configurations. Indeed, if it is decided to contain the resin 41, the containment component 36 may be fabric, pre-coiled metal tape, metal or plastic sleeves, cylindrical collars, clamps, hollow segments, and so on.

C. Apply Resin and Allow Resin to Penetrate the Dry Fiber Structure

Referring now to FIG. 1 and FIG. 6, during the repair, resin 41 may be poured inside the containment component 36 through openings or fill tubes, for example, with the resin 41 initially resting on top of the dry fiber structure 12 disposed on the pipe 14 (block 6). The resin viscosity, pot life, and other properties may be specified such that the resin penetrates into and around the fibers by gravity, by capillary action, or by applying pressure (block 7). In general, simply allowing the resin to impregnate the fibers by gravity and/or capillary action may provide for ease of installation relative to techniques in which the containment component 36 is pressurized to assist in resin impregnation of the dry fiber structure 12. However, additional pressure, as indicated, may be applied, such as with an external pumping mechanism (not shown), or by pushing or squeezing a flexible shell (e.g., fabric, plastic, etc.) against the resin, and so on. Ultimately, the resin cures to form a composite or matrix of the resin and fiber to repair the anomaly, advance the integrity of the piping system, and/or to restore operating pressure capability of the piping system (block 8).

To deposit the resin 41 into the containment component 36, openings 38 and 40 in the containment component 36, as illustrated in FIG. 6, may receive resin and/or displace air. For example, a polymeric material or resin 41 may be poured into the opening 38, while air in the cavity within the containment component 36 escapes through the opening 40 as the air in the cavity is displaced by the incoming resin 41. Alternatively, a single opening in the containment component 36 instead of two openings, or more than two openings in the containment component 36, may be utilized to add resin 41. Furthermore, sealable openings at other portions of the repair system 10, such as at the seals 32, may be used to add resin 41 inside the containment component 36.

The openings 38 and 40 may comprise fittings 42 and 44 or other connectors configured to receive tubes 46 and 48 that facilitate the filling of resin 41 and/or the displacement of air. In the illustrated embodiment of FIG. 6, resin 41 is poured into opening 38 via fill tube 46, as depicted by reference arrow 60. Air is displaced from inside the containment component 36 out opening 40 via tube 48, as depicted by reference arrow 62.

It should be understood that the use of the containment member 36 is merely one example of how the resin 41 may be applied to the dry fiber structure 12 on the pipe 14. Other alternatives include applying the resin to the dry fiber structure 12 using a brush, for example, after the dry fiber structure 12 has been placed on the pipe 12. While this alternative does provide for containment of the resin, it provides a less expensive repair because the containment member 36 is not used.

D. Exemplary Layers of Pipe Repair

Figure 7:
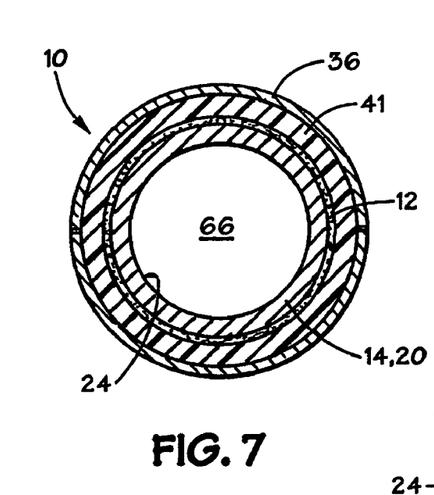
FIG. 7 is a cross-sectional view of the pipe of FIG. 5 taken along line 6-6 in accordance with an exemplary embodiment of the present invention.

The exemplary layers of the pipe repair system 10 are depicted in FIG. 7, a cross-sectional view of the pipe repair system 10 taken along section line 7-7 in FIG. 6. In the center of the cross-section is the pipe 14 having an inside surface 24. Upon completion of the pipe repair system 10, the initially dry fiber structure 12 disposed on the pipe 14 is substantially saturated with the now cured resin 41. Further, the cured resin 41 also sits atop the dry fiber structure 12 within the containment component 36. Together, the resin 41 and fiber structure 12 form a matrix or composite on the pipe 14 and within the containment component 36.

The containment component 36 may remain installed or be removed, depending on the particular application. To remove the containment component 36, the containment component 36 may be cut, the fastening elements 37 dismantled, and so forth. It should be noted that if the containment component 36 remains, it is typically the outer component of the repair system 10. In this case, the outer surface 54 of the containment component 36 is the outer surface of the pipe repair system 10. Again, however, the containment component 36 may be removed.

E. Repair of Pipe Elbows and Pipe Bends

Figure 8:
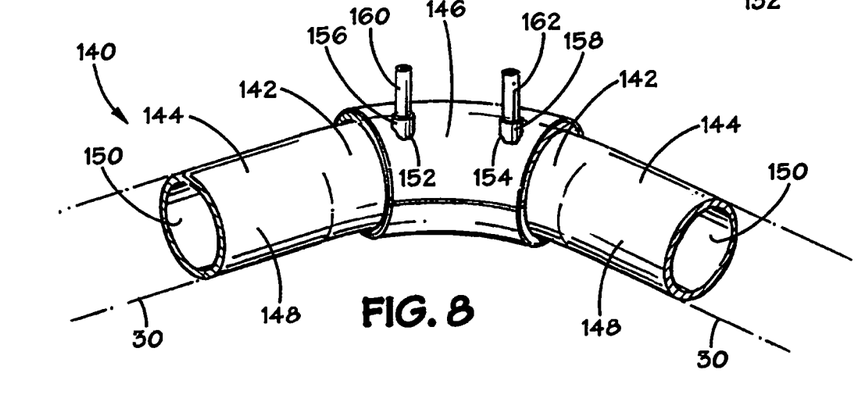
FIG. 8 is a perspective view of a pipe repair system applied to an elbow or bend of a piping system in accordance with an exemplary embodiment of the present invention.

Finally, it should be noted that the pipe repair system 10, as depicted in FIG. 8, may be advantageously applied to an elbow 142 of a pipe 144. Again, as with the pipe 14 of previous figures, the pipe 144 (and elbow 142) may comprise a portion of a pipeline 30 and include an outer surface 148 and an inner surface 150. However, as appreciated by those of ordinary skill in the art, the change in direction of the elbow 142 of the pipe 144 poses additional repair challenges. Nonetheless, the present techniques apply to repair of pipe elbows 142, other pipe bends, and other irregularly shaped objects in need of repair.

The containment component 146 depicted in this alternate embodiment may include openings 152 and 154 for pouring resin inside the containment component 146, as well as for displacing air from within the containment component 146. Furthermore, as previously discussed, the containment component 36 may include fittings 156 and 158 at the openings 142 and 154, as well as fill tubes and/or air tubes 160 and 162. Finally, though not illustrated, the pipe repair system 10 depicted in FIG. 8 will generally include the fiber structure 12 and resin 41 forming a composite over a anomaly on the pipe elbow 142, for example, under the containment component 146.

F. Containment Component Configurations and Fasteners

Figure 9:
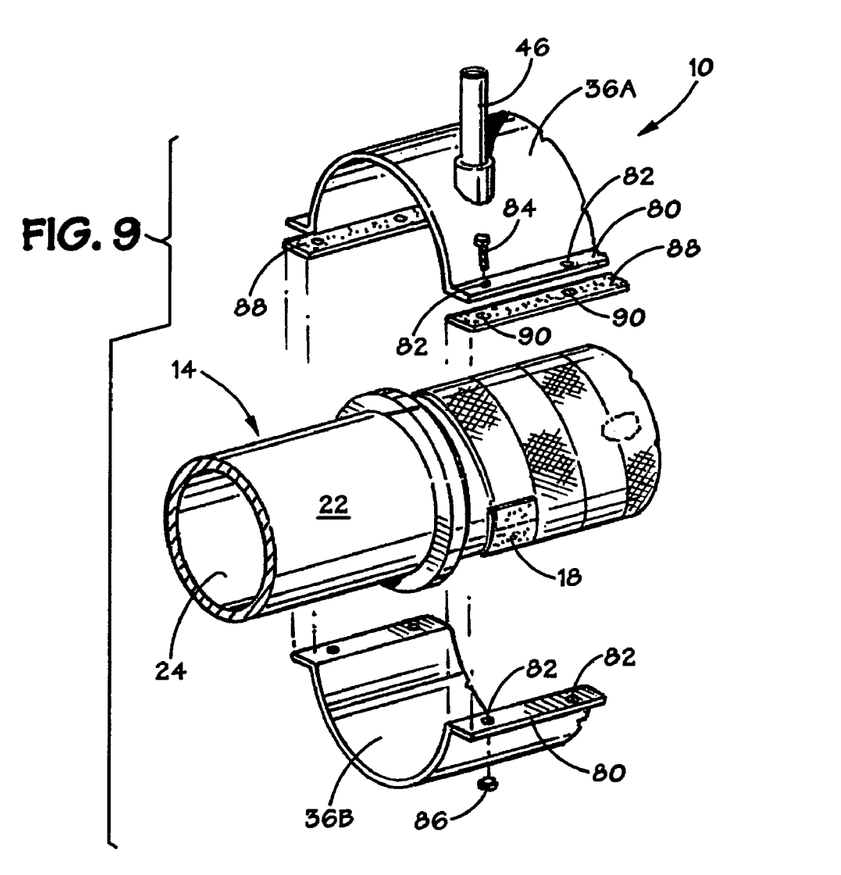
FIG. 9 is an exploded view of a portion of the pipe of FIG. 5 illustrating in more detail an exemplary connection of two halves of the outer component in accordance with an exemplary embodiment of the present invention.
Figure 10:
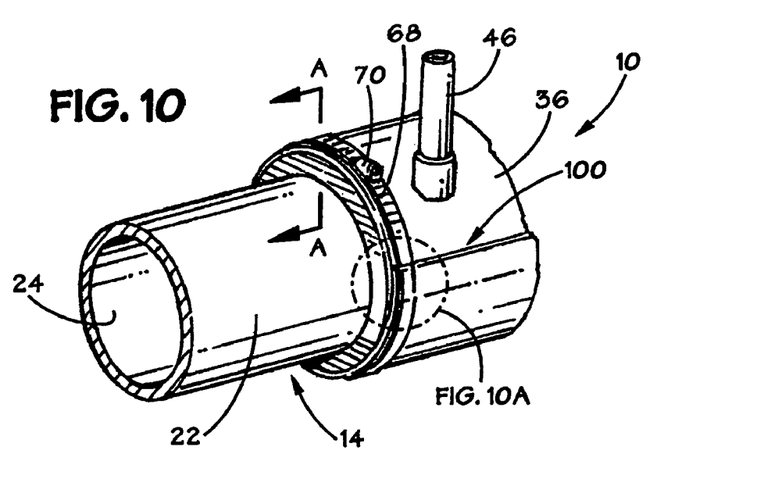
FIG. 10 is perspective view of a portion of the pipe having an alternate outer component and alternate connection disposed on the outer component in accordance with an exemplary embodiment of the present invention.

FIGS. 9 and 10 illustrate examples of how the containment component 36 may be secured in the pipe repair system 10. In FIG. 9, the containment component 36 may be a thin material, such as sheet metal or plastic, and so on, having flanges 80 that mate to piece the two halves 36A and 36B together. The flanges 80 have holes 82 configured to receive bolts 84 that mate with nuts 86. Optionally, a gasket material 88 having holes 90 may be used to improve the seal between the two halves 36A and 36B of the containment component 36. It should be emphasized that the containment component 36 may not comprise two separate halves, but instead comprise a single structure having a hinge on one side, for example, and enclosed with a flange on the other side.

Figure 10A:
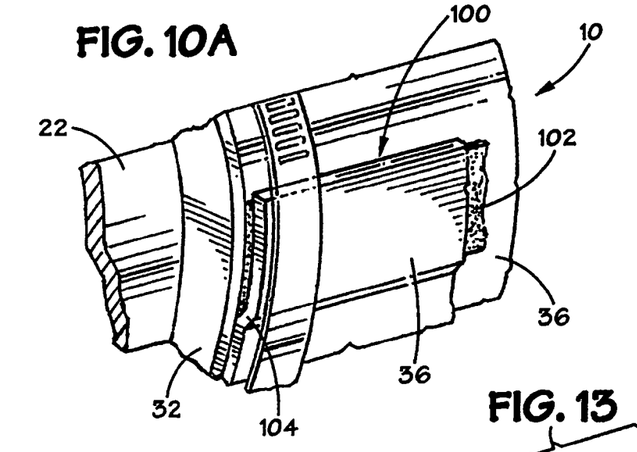
FIG. 10A is a detailed view of a portion of FIG. 10.

As depicted in FIG. 10, the containment component 36 may be a single piece or wide strip of material. The containment component 36 may be a flexible or semi-flexible material, such as sheet metal, plastic sheet, fabric roll, and so on. To encase the portion of the pipe 14 to be repaired, the flexible containment component 36 strip is wrapped around the pipe 14. An end 100 of the containment component 36 strip overlaps the other end of the containment component 36. To better illustrate the detail of the overlap seal of the containment component 36 strip, FIG. 10A depicts an exploded view of the pipe repair system 10 showing the strip end 100 of containment component 36. To complete the installation of the containment component 36, a hose clamp 68 or other component may secure the containment component 36 strip wrapped around the portion of the pipe 14 having the dry fiber structure 12. Optionally, a sealing material 102 or resin 41 may further secure and seal the strip end 100 of the containment component 36 in the pipe repair system 10.

Figure 11:
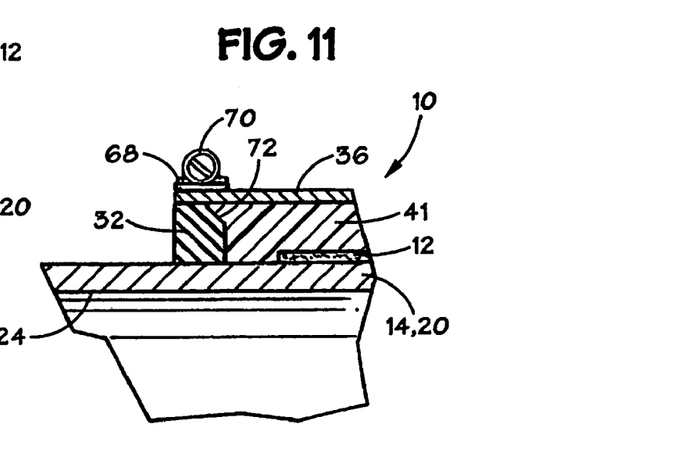
FIGS. 11 and 12 are alternate cross-sectional views taken along section line A-A of FIG. 5 showing details of one end of the pipe having a hose clamp to secure the outer component around the repaired pipe in accordance with exemplary embodiments of the present invention.
Figure 12:
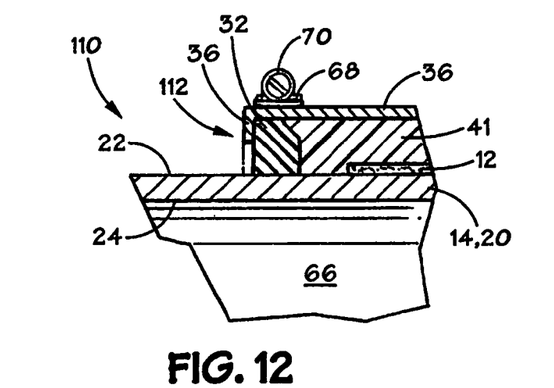

Referring to FIGS. 11 and 12, a cross section taken along section line A-A at an end of the pipe repair system 10 in FIG. 10 depicts exemplary stabilizing alternatives of the containment component 36. In FIG. 11, for example, a hose clamp 68 wraps around an end of the containment component 36 to secure the containment component 36 in the system 10. The clamp 68 may also further compress the seals 32 to reduce the potential for escape of resin 41 from the containment component 36. In the illustrated embodiment of FIG. 11, the hose clamp 68 has a typical screw 70 for tightening the clamp 68 around the containment component 36. Moreover, an optional surface 72 on the seal 32 may facilitate sealing of the resin 41 cavity.

Similarly, FIG. 12 depicts the pipe repair system 10 having features, similar to that of FIG. 11, however, with a lip 112 formed on the end of the flexible containment component 36. Such a lip 112, for example, may facilitate installation and positioning of the containment component 36, as well as advance the integrity of the seal 32, substantially preventing escape of resin 41 from the pipe repair system 10. Moreover, formation of such a lip 112 with a thin containment component 36 (e.g., sheet metal) may be relatively straightforward.

Figure 13:
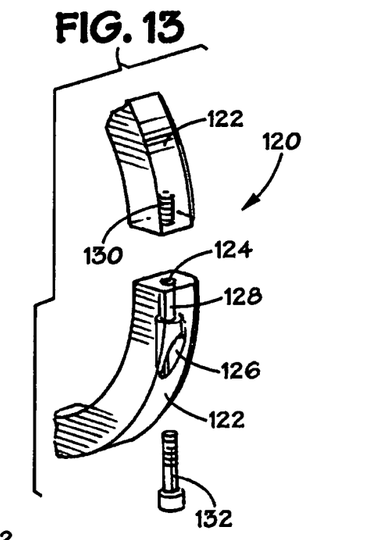
FIG. 13 is a perspective view of an exemplary fastener (in lieu of a hose clamp) for fastening the outer component around the repaired pipe, the outer component used to retain the resin in accordance with an exemplary embodiment of the present invention.

An alternate exemplary fastener 120 for fastening the containment component 36 around the pipe 14 is depicted in FIG. 13. The exemplary fastener 120 may be used with different types of containment components 36. For example, the fastener 120 may be used in lieu of the hose clamp 68 to secure a flexible containment component 36. On the other hand, the fastener 120 may be used to secure a more rigid and/or thick pipe-type containment component 36 in the repair system 10. Moreover, the fastening element 120 may be integral to or part of the containment component 36, and not an independent component.

The components of the fastener 120 may include two pieces, for example, having an outer surface 122. A hole 124 and receptacle 126 may be provided on one of the pieces of fastener 120 to receive a screw or bolt 132. In this embodiment, the screw 132 may enter the receptacle 126 through an interior tube 128 through hole 124 and with the threaded portion of bolt 132 received by the female threaded cavity 130 in the other piece of the fastener 120.

It should be emphasized that a variety of fastening elements, such as hose clamp 68, fastening element 120, welded elements, glue, adhesives, staples, flanges, bolts, screws, and other components, may be used to secure the containment component 36 in the pipe repair system 10. Such fastening components and elements may also provide compressive force of the containment component 36 against the seals 32 (e.g., seal ends) to provide for effective sealing of the resin within the cavity formed between the inner surface of the containment component 36 and the outer surface 22 pipe 14.

G. Resin/Fiber Embodiments of the Pipe Repair System

In certain embodiments of the pipe repair system 10, the reinforcing material is a dry fiber structure and the polymeric material is a resin (e.g., an epoxy system). Appropriately specified dry fibers and liquid resins provide for a self-developing composite formed on the pipe 14. In construction, one or more layers of a dry fiber structure 12 are applied or wrapped around the pipe 14. Resin 41 is disposed, applied, or poured on top of the fiber structure 12 (i.e., within an outer shell, for example). Significantly, no pre-wetting of layers of dry fiber structure 12 with resin 41 is required. Thus, the cumbersome handling and wet lay-up of a resin-saturated wet fiber may be advantageously avoided. Again, the properties of the resin 41 and dry fiber structure 12, as discussed, may be designated so that the resin 41 penetrates through the layers of the dry fiber structure 12 to the pipe 14 surface without the untidy hand lay-up of wet fiber saturated or impregnated with resin. Finally, it should be again emphasized that in addition to the repair or reinforcement of piping, the present techniques apply to the repair or reinforcement of vessels, vessel nozzles, other equipment, and so on.

Figure 14:
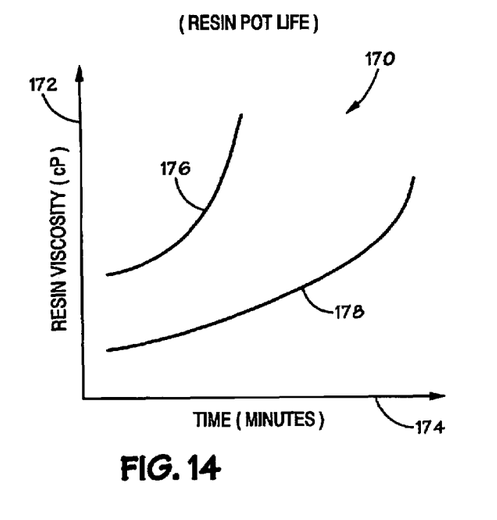
FIG. 14 is a plot of resin viscosity versus time, and is an indication of resin pot life in accordance with an exemplary embodiment of the present invention.

FIG. 14 is a plot 170 of resin viscosity 172 in centipoises (cP), for example, versus time 174 in minutes, for example. The plot 170 may be representative of the pot life of the particular resin. The pot life of a resin may be a measure of the point at which the viscosity of the resin increases to where the resin can no longer be readily manipulated, molded, and applied to a dry fiber structure, and so on. The initial viscosity values of the resin prior to expiration of the resin pot life may be in the range of 1-10 cP, for example.

In the illustrated embodiment, the plot 170 shows two curves 176 and 178. Curve 176 is a representation of a typical resin employed in composite repair of piping. The typical resin tends to increase in viscosity fairly rapidly (and exponentially) with a short pot life. In contrast, curve 178 represents a resin or polymeric material that may be more appropriate for the present techniques in that the resin viscosity increases at a slower pace having a higher pot life (e.g., 20-200 minutes), and thus, in part, allows for the resin 41 to penetrate through the dry fiber structure 12 prior to a significant viscosity increase. However, it may be beneficial to define a window of pot life time, because excessive pot life may result in leakage of the resin from the pipe repair system 10, excessive repair time, and so on.

Exemplary components and their properties for a resin 41 system for the present technique are given in Table 1 below. It should be noted that the resin 41 may include pre-polymers, hardeners, polymeric resins, and so on. Indeed, a resin 41 system may typically include the resin (i.e., a prepolymer which cures to a polymer) and a hardener that facilitates curing (i.e., crosslinking into a thermoset). Shown in Table 1 is a compendium of formulations depicting the nature of components, their contribution and exemplary weight levels used in typical formulas. It should be emphasized, however, that the present techniques may employ candidate resin systems outside of the tabulated ranges and properties.

The exemplary information in Table 1 demonstrates an exemplary compromise between various properties of low viscosity, strength, hardness, wetting and reactivity to obtain suitable resin candidate systems (including the resin and hardener) for the pipe repair composite. A consideration is the potentially conflicting needs of low viscosity components while maintaining adequate strength of the composite. Moreover, there is a certain importance to the reactivity of the curing agent or hardener (e.g., polyamines) used in the resin 41. A combination of fast polymerization with extended pot life may allow for cure to happen quickly while allowing enough pot life so that the resin 41 adequately penetrates through the fiber 12. In certain examples, attention may focus on lower molecular weight items so that wetting is improved and not as quickly reduced upon reaction of resin 41 and hardener. Ultimately, upon resin curing, composite strength is measured, for example, by tensile properties of the composite. Further, hardness of the composite may also be an indicator of the integrity of the composite structure.

TABLE 1

EXEMPLARY RESIN/POLYMER RANGES AND FUNCTIONS

| Material | Viscosity | MW | Function | Amount (%) |
|---|---|---|---|---|
| DGEBPA | 13,000 cps | Approx 380 | Hardness, Strength, moderate reactivity | 25.5-67 |
| NPGDGE | 18 | ~280 | Low viscosity, difunctional | 6-9 |
| Xylene | <1 | 106 | Wetting and low viscosity | 0-0.5 |
| CHDMDGE | 65 | ~340 | Low viscosity, difunctional | 0-25.5 |
| Cyclic Ester | 2 | ~90 | Wetting, low viscosity and reactivity | 2-3 |
| Modified DGEBPA | ~250,000 | ~400 | Increased reactivity, strength | 0-9 |
| Modified Amine | 50 | Mixture of amines | Low viscosity, slow even reaction | 0-16 |
| Aliphatic Amine | 20 | ~160 | Low viscosity, moderate reactivity, strength | 0-5.5 |
| Modified amine w/ aromatic content | 2000 | >300 | Good low temperature cure with moderate strength | 0-19 |
| Polyether amine | 80 | >300 | Low reactivity, wetting | 0-17.5 |

DGEBPA = Diglycidyl ether of Bisphenol A
NPGDGE = Neopentyl glycol diglycidyl ether
CHDMDGE = Cyclo hexane dimethanol diglycidyl ether II. Piping Anomalies and Surveys The failure, potential failure, or anomaly 16 of the pipe 14 to be repaired may include corrosion, erosion, pitting and so forth that may reduce the wall thickness and thus, the pressure rating of the pipe 14 and the associated pipeline 30. Such a failure or anomaly 16 may be detected, for example, by a variety of survey and testing techniques discussed below. The failure or anomaly 16 may be defined by depth, area, volume, axial and radial dimensions, and other dimensions and measures. In the illustrated embodiment of FIG. 2, the failure or anomaly 16 is formed on the outer surface 22 of the pipe 14.

However, it should be emphasized that the present techniques also apply to mitigating internal failures or internal potential failures 16 of the pipe 14.

Piping anomalies 16 may be caused by corrosion, erosion, mechanical damage, and so forth. Corrosion may be characterized as a chemical or electrochemical reaction that propagates over the exposed surface of the pipeline, resulting in failures or potential failures and thinning the metal wall. External corrosion may be caused by the heterogeneous nature of soils for underground piping, and by chemical attack from the environment for above-ground piping, for example. Internal corrosion of piping may be caused chemical attack of the piping contents on the inside surface of the pipe. Corrosion may be advanced due to the presence of a localized blemish, such as gouge or scratch in the pipe 14 surface or coating. Moreover, internal erosion may occur due to the flow of the contents through the pipeline. Such erosion may be exacerbated by the presence of particulates in the flowing contents, or by a change in the direction of the flow of the contents through the pipeline, such as at a piping elbow or tee, for example. Furthermore, mechanical damage, such as inadvertently striking an underground pipeline while digging may result in an anomaly on the pipe 14. In any case, whether internal or external corrosion/erosion, or mechanical damage, a resulting reduction in the wall thickness 26 of the pipe 14 may unfortunately reduce the pressure rating and/or pressure-holding capacity of the pipe 14 or pipeline 30. As might be expected, operation of an excessively damaged pipeline 30 may be problematic, necessitating the repair, replacement, or abandonment of the pipeline.

In general, the operations and maintenance personnel of piping systems may determine if a failure or anomaly 16 discovered in a pipeline 30, for example, should be repaired or if a section of the pipe 14 should be replaced. Without a doubt, there is an ever increasing need in the industry for pipe repair techniques that cost-effectively identify and repair the failure or anomaly 16. On the whole, examples of anomalies 16 include localized and generalized imperfections, gashes, gouges, scratches, mechanical damage, erosion, internal and external corrosion, and so on. In general, objectives of pipeline 30 inspection may include the detection of and sizing of anomalies 16 (e.g., cavities, pits, corroded areas, etc.), and so on. The analysis may determine the number, size, depth, and axial length of the potential failure or anomaly 16 to decide on the required action, such as if the pipe needs to be repaired or replaced.

Operators, technicians, engineers, maintenance personnel, service providers, and so forth, may utilize both external and internal surveys to determine and evaluate the condition of pipeline 30 and its anomalies 16, failures, or potential failures to determine if pipe 14 should be repaired or replaced. Survey techniques may include cathodic-protection potential surveys to evaluate the effectiveness of external corrosion control system (e.g., coatings) installed on pipelines 28, such as transmission pipelines. Low potentials recorded during these surveys may be indicative of coating damage, for example. A follow-up external coating analysis may pinpoint areas of coating damage on the pipeline 30. In general, areas of coating damage may be at high risk for active corrosion. Other survey techniques include the use of internal tools, such as intelligent pigs which are also called online inspection tools and smart tools. As appreciated by those of ordinary skill in the art, intelligent pigs are devices routed through pipelines and having sensors to detect metal variations of the pipeline. Additional testing techniques include an ultrasonic thickness gauge, which may be employed to measure either internal or external corrosion. Furthermore, basic measurement tools for external corrosion include straight edges or rulers, pit gauges, scales or profile gauges, bridging bars, and so on.

Pipeline information generated from internal and external survey techniques may include data on the piping welds, branch connections, valves, wall thickness changes and losses, anomalies, failures, potential failures, and so forth. Moreover, repair standards established by the American Society of Mechanical Engineers (ASME) and other organizations and authorities may provide for the assessment and analysis of pipeline corrosion and anomalies, measurement techniques, and engineering calculations, such as for the calculated burst pressure (or remaining pressure capacity) of the corroded pipe 14. In general, if the remaining pressure carrying capacity exceeds the maximal allowable operating pressure (MAOP) by a sufficient margin, the inspected segment or pipe 14 may remain in service.

Variables in such calculations and other considerations that may be obtained and analyzed prior to making a repair decision include the pipe 14 dimensions, yield strength, anomaly depth, anomaly axial length, geometric shape factor, installation pressure, pipeline MAOP, class location, and other applicable pipeline company standards. Furthermore, the operator or service provider may consider the pipeline 30 location, anomaly 16 location on the pipe 14, and the type of anomaly 16. Of course, a repair application may be conditional or modified per the manufacturer or special requirements. Ideally, it is generally desired that the repair meet or exceed the strength of the pristine pipe 14 and allow the pipeline 30 to return to service at 100% of is maximum allowable operating pressure (MAOP).

III. Exemplary Reinforcing Materials

In pipe composite repair, the tensile properties of the repair beneficial to restoration of the 100% MAOP are typically primarily promoted by the reinforcing fiber element of the system, such as the exemplary dry fiber structure 12 depicted in FIGS. 2 and 3. The dry fiber structure 12 may be constructed of a variety of materials, such as glass, advanced polymers, carbon, organic materials such as Kevlar, inorganic materials such as ceramic, polyester, polyacrylics, polypropylene, Nylon (polyamide fibers), and other materials. In general, the dry fiber structure 12, such as a fiber mat or tape, may be configured to receive a polymeric material such as a resin 41 or adhesive to form a fiber-reinforced composite. For example, the dry fiber structure 12 may have a weave structure to facilitate formation of a matrix or composite when the polymeric or resin 41 material is applied to the dry fiber structure 12. The fiber structure 12 may be self-wetting in that the properties of the fiber structure 12 and the applied polymeric material facilitate saturation of the fiber structure without application of external pressure.

Many types of fibers, such as glass fibers, carbon fibers, and others, may be utilized in the present techniques. Particularly beneficial fibers (i.e., for stiffness, strength and application properties) are carbon fibers. Many forms of carbon fiber may be used. An exemplary form of useful carbon fiber is woven tape. An advantageous tape construction may be unidirectional carbon (warp) with some other non-structural or less structural fiber (glass or polyester) in the weft direction. Exemplary manufacturers of beneficial fibers include: Zoltek, Torah, Cytec, Hexcel (Hercules), Toho, Mitsubishi and Grafil. Exemplary tensile strength ranges of fibers utilized in the present techniques include 350 to 800 thousand pounds per square inch (KSI). Fibers with a modulus of greater than 25 million pounds per square inch (MSI) are also effective, for example. However, it should be emphasized that lower and higher tensile strengths and moduli can effectively be implemented with the present techniques.

Further, it should be noted that fiber tapes and other fiber structures can be manufactured with a number of constructions. For example, in certain embodiments, the fibers of the dry fiber structure 12 may be unidirectional or omni-directional. Exemplary fibers may be made with carbon tows (a collection of carbon monofilaments defined as a yarn) made up of 1000 to 50,000 monofilaments woven in various ways to obtain the fiber content and structure desired. A more particular example is a 3-inch tape having 12 warp yarns/inch, constructed from yarn having 12,000 monofilaments/inch of fiber having a weight of 12 ounces per square yard. In yet another example, the dry fiber structure 12 is a plain-weave carbon fabric constructed with 12,000 tows (monofilaments) in a hoop direction and 63,000 tows in the axial direction. In general, the fiber structure 12 may be self-wetting in that the weave structure and other properties of the fiber 12 may be specified to facilitate penetration of polymeric material (e.g., resin 41) into the dry fiber structure 12.

In the illustrated embodiments, application of the dry fiber structure 12 to the pipe 14 is straightforward because the dry fiber structure 12 may be installed dry without pre-wetting of the dry fiber structure 12. For example, the dry fiber structure 12 (e.g., a carbon fabric reinforcement) is not wetted with polymeric material, such as an epoxy or other resin, prior to applying the dry fiber structure 12 to the pipe 14. Moreover, it should be noted that the failure or anomaly 16 of the pipe 14 may be filled with a filler material prior to applying or wrapping the dry fiber structure 12 around the pipe 14. Further, the number of wraps or layers of the dry fiber structure 12 around the damaged pipe 14 may depend on the desired pressure rating or desired maximum allowable operating pressure of the repaired piping system. Engineering properties of the dry fiber structure 12 which may be considered include the ultimate tensile strength and modulus in the longitudinal and transverse directions of the dry fiber structure 12 (and ultimately the repaired pipe 14). Properties of the cured composite to be considered may include shear strength, glass transition temperature, and the coefficient of thermal expansion, and so on. Finally, as appreciated by those of ordinary skill in the art, the completed repair system 10 may be subjected to a variety of testing to determine the in-service integrity of the system 10.

IV. Polymeric Repair Material

Exemplary polymeric materials applied to the reinforcing material (e.g., dry fiber structure 12) may include thermosets or resins 41, such as phenolic resins, epoxy resins, polyurethanes, amino resins, Nylon, polycarbonates, and so on. Indeed, exemplary fluid resins 41 include an epoxy system, a polyester system, a vinyl ester system, a urethane system, or a methacrylate system, or any combination thereof. Exemplary thermoplastics that may be utilized as resin 41 include polyethylene, polypropylene, polyvinyl chloride, polystyrene, and other thermoplastics. Further, it should be noted that the polymeric material or resin applied to the fiber structure 12 may initially be a short chain prepolymer molecule. For additional details of exemplary materials and exemplary property ranges, refer to Table 1.

In the case of epoxies, the epoxy resins generally refer to a family of molecules or oligomers containing at least one epoxide group. Common epoxy resins include glycidyl ethers of alcohols or phenolics. Liquid epoxy resin is the typical diglycidyl ether of bisphenol A (DGEBA) and represents a majority of the resin used in industrial applications. These products are solid or liquid with varying consistencies and have the ability to react via the epoxy end-groups to generate three dimensional networks providing the final material with rigidity, hardness and the inability or substantial inability to reflow. The final products may be characterized by their electrical properties, adhesion (i.e., facilitated by the presence of polar groups in the epoxy), shrinkage, impact resistance, moisture resistance, and so on. This family of thermosets is used in many applications like composites, coatings, adhesives and encapsulating materials. The epoxide group on the end of these molecules serves as the reactive site for crosslinking in these thermoset polymers. It should be noted that other thermosets without epoxide end groups may also be employed with the present techniques. For example, urethane prepolymers ending with isocyanate groups may be employed. Further, polyesters having unsaturated groups may be used in the pipe repair system 10. As previously emphasized, a wide variety of polymer and resin systems may be configured for use in the repair system 10.

The chemical chosen to react with these epoxies and other resins or thermosets is referred to as the curing agent (or hardener), and it typically has active hydrogen attached to nitrogen, oxygen, or sulfur. Commonly, the active hydrogen is either attached to nitrogen or part of a mercaptan (—SH) group. In the case of epoxy resins, amine curing agents are the most common and can be primary or secondary, aliphatic or aromatic, or cycloaliphatic. The amines typically have greater than three reactive sites per molecule that facilitate the formation of a three-dimensional polymer network when mixed with the epoxy resin. The selection of the curing agent depends on many parameters and may determine, to a large extent, the performance of the final epoxy thermoset. Moreover, while the reaction of amines and epoxides may take place at ambient temperature, care should be taken in the selection of the curing agent to insure that a complete reaction takes place. Amines designed for ambient temperature applications may employ plasticizers to insure complete reaction. Furthermore, amines designed for heat-cured reactions may use little or no plasticizers and typically give thermosets with higher strength and thermal performance.

Chemical cross-linking generally starts as the epoxy resin and non-latent curing agents are mixed. Curing agents may be slow to react with epoxies, such as aromatic amines or anhydrides, and may maintain low viscosity in larger masses or if heated. Aliphatic amines, cycloaliphatic amines and amidoamines, however, may increase in viscosity rapidly, proportional to the total formulation mass. Curing agents, such as certain cycloaliphatic amines, amidoamines, and aliphatic amines, may be added to the formulation to extend the resin 41 pot life slow the viscosity build. As mentioned, processing temperatures may play a significant role in determining the properties of the final composite. Moreover, the times and temperatures employed may depend on the curing agent selection.

In general, a composite may include a material reinforced by fibers or other elements with a discernable aspect ratio of length to thickness. Common fibers employed with epoxies are glass and carbon. However, aramid, boron, and other organic and natural fibers, as previously indicated, may also used. Polymers used in composites are typically thermosets, and their purpose is to transfer the load or stresses to the fiber reinforcement in order to take advantage of the strength and stiffness (modulus) of the fibers. Exemplary fiber volumes may range from 40% to 80%, such volumes calculated based on the desired strength, pressure rating, and other factors of the particular application. The final physical, thermal, electrical and chemical resistance properties of the composite are determined by the choice of resin and curing agent, and the cure conditions. In epoxy systems, the parameters to consider in the selection of the appropriate curing agent for an epoxy resin formulation are viscosity, mass effect, curing cycles, glass transition temperatures, fracture toughness, and other factors. The viscosity of the formulation should be low enough to substantially penetrate the reinforcing fibers 12. Mixtures of epoxy resin and curing agents having relatively higher viscosities may be heated to lower the formulation viscosity. However, heating may reduce the working time by accelerating the reaction depending on the type of curing agent.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method of reinforcing an object, comprising:
   applying a fiber structure to a surface of the object, wherein the object comprises a vessel, a pipe, a nozzle, or any combination thereof, and wherein the fiber structure is not impregnated with polymeric material prior to or while applying the fiber structure to the object;
   installing a containment element adjacent to the fiber structure;
   disposing an uncured polymeric material between the containment element and the fiber structure to substantially saturate at least a portion of the fiber structure, and wherein at least a portion of the uncured polymeric material penetrates through the fiber structure to the surface of the object; and
   permitting the polymeric material to cure to form a composite of the fiber structure and the polymeric material on the surface of the object.

2. The method as recited in claim 1, wherein the containment element forms a cavity with a portion of the object having the fiber structure.

3. The method as recited in claim 1, comprising substantially sealing the containment element to the object.

4. The method as recited in claim 1, wherein the containment element comprises a shell, and wherein placing the polymeric material comprises pouring the polymeric material inside the shell through an opening disposed on the shell.

5. The method as recited in claim 1, wherein the fiber structure is self-wetting.

6. The method as recited in claim 1, wherein the properties of the fiber structure and the polymeric material facilitate saturation of the fiber structure without application of external pressure.

7. The method as recited in claim 1, wherein the polymeric material penetrates through the fiber structure to the surface of the object by gravity or capillary action, or a combination thereof.

8. The method as recited in claim 1, wherein applying the fiber structure comprises wrapping the fiber structure around an outer surface of the object.

9. A repaired pipe, comprising:
   a reinforcing structure disposed on an outer surface of the pipe;
   an outer containment component installed around a portion of the pipe having the reinforcing structure; and
   a cured polymeric material disposed inside the containment component after the reinforcing structure and forming a composite with the reinforcing structure, wherein the cured polymeric material reaches the outer surface of the pipe through the reinforcing structure, and wherein the reinforcing structure comprises 40% to 80%, by volume, of the composite.

10. The pipe as recited in claim 9, wherein the reinforcing structure comprises a fiber structure.

11. A system for repairing a pipe, comprising:
    a fiber material not impregnated with resin nor wet with resin, and configured to wrap around the pipe and to receive a resin after installation of the fiber material on the pipe;
    a container configured to encase a portion of the pipe having the fiber material; and
    a fluid resin formulated to be poured inside the container to substantially saturate the fiber material and to penetrate through the fiber material to an outer surface of the pipe, and to form a composite with the penetrated fiber material on the portion of the pipe.

12. The system as recited in claim 11, wherein the pot life of the fluid resin is in the range of 20 minutes to 200 minutes.

13. The system as recited in claim 11, comprising at least one sealing element configured to substantially seal the container with the pipe and dry fiber, wherein a cavity is formed between the container and pipe to receive the fluid resin.

14. The system as recited in claim 11, wherein a tensile strength of the dry fiber is in the range of 350,000 to 800,000 pounds per square inch.

15. The system as recited in claim 11, wherein the fluid resin comprises an epoxy system, a polyester system, a vinyl ester system, a urethane system, or a methacrylate system, or any combination thereof.

16. The system as recited in claim 11, wherein the fluid resin comprises solid particulates.

17. The method as recited in claim 1, wherein the containment element comprises a rigid shell.

18. The method as recited in claim 1, wherein disposing an uncured polymeric material comprises pouring an uncured polymeric material into the containment component.

19. The method as recited in claim 1, wherein disposing an uncured polymeric material comprises disposing an uncured polymeric material between the containment element and the fiber structure without pressurizing the uncured polymeric material to substantially saturate at least a portion of the fiber structure.

20. The method as recited in claim 1, wherein forming the composite increases the operating pressure capacity of the object.

* * * * *